United States Patent [19]

Bernard et al.

[11] Patent Number: 4,562,778
[45] Date of Patent: Jan. 7, 1986

[54] HIGH TEMPERATURE REACTION APPARATUS

[75] Inventors: Philippe Bernard, Paris; Francois Prudhon, Versailles, both of France

[73] Assignee: Rhone-Poulenc Chimie de Base, Courbevoie, France

[21] Appl. No.: 612,541

[22] Filed: May 21, 1984

[30] Foreign Application Priority Data

May 20, 1983 [FR] France ................... 83 08394

[51] Int. Cl.$^4$ ............................................. F23C 1/02
[52] U.S. Cl. .................................. 110/260; 34/22;
    110/213; 110/215; 110/237; 110/238; 431/173
[58] Field of Search ............. 110/210, 211, 212, 213,
    110/214, 215, 237, 238, 244, 260; 431/5, 8, 173,
    175, 285, 352; 34/22

[56] References Cited

U.S. PATENT DOCUMENTS

| | | | |
|---|---|---|---|
| 3,885,906 | 5/1975 | Shurygin et al. | 431/173 |
| 3,974,021 | 8/1976 | Bernadiner et al. | 110/260 |
| 4,267,131 | 5/1981 | Prudhon et al. | 34/22 |
| 4,316,878 | 2/1982 | Akune et al. | 110/238 |
| 4,350,101 | 9/1982 | Prudhon et al. | 110/238 |
| 4,351,252 | 9/1982 | Shindome et al. | 110/237 |

Primary Examiner—Albert J. Makay
Assistant Examiner—Steven E. Warner
Attorney, Agent, or Firm—Burns, Doane, Swecker & Mathis

[57] ABSTRACT

A high temperature reactor includes a reaction chamber which is symmetrical about a longitudinal axis. Surrounding the reaction chamber are annular spaces to which a gaseous reactant is supplied. A plurality of conduits conduct the gaseous reactant from the annular spaces to the reaction chamber and introduces the gaseous reactant into the latter in the form of a helicoidal flow. A plurality of cooling conduits are disposed between the annular spaces and the reaction chamber for conducting a cooling medium. The cooling medium can also be conducted so as to cool a rear end of the reactor. The reactor can be used in combination with a contacting chamber to supply hot gases thereto.

19 Claims, 3 Drawing Figures

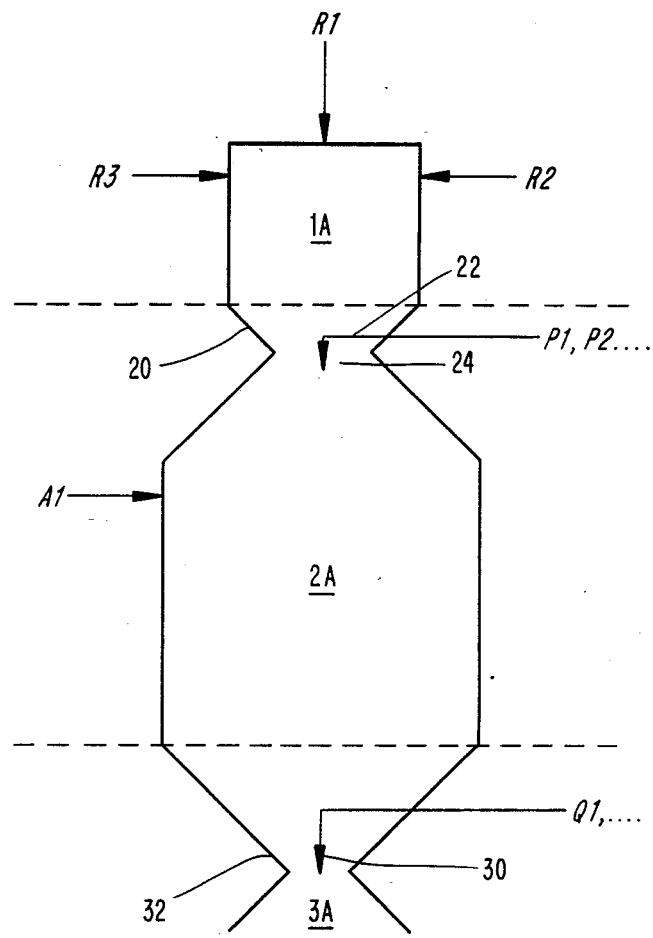

HIGH TEMPERATURE REACTION APPARATUS

BACKGROUND OF THE INVENTION

1. Field of the Invention

The present invention relates to an apparatus for high temperature reaction and, in particular, for combustion.

This apparatus is more particularly intended for generating hot gases and for producing a symmetrical helical flow thereof.

2. Description of the Prior Art

The apparatus generates gas at high temperature for use in an apparatus of the type disclosed, for example, in U.S. Pat. Nos. 4,257,339 and 4,350,101 (corresponding to European Pat. No. 7846) by applying the properties of an axially symmetrical helically spinning flow to the treatment of a phase that can be sprayed.

The apparatus according to the present invention may be used for carrying out the process described in U.S. Pat. No. 4,124,353 (corresponding to French Pat. No. 2,276,086) wherein combustion occurs in a region which is of reduced pressure and recessed relative to a symmetrical helical flow of gaseous reactant.

It is known that such a process makes it possible to provide a hot gas apparatus having a cool wall, but it is nonetheless limited in the attainment of high temperatures. Thus, the apparatus is limited in usefulness when used in a process in accordance with the afore-mentioned U.S. Pat. No. 4,257,339. The latter involves an in situ generation of hot gases in a first region by causing such gases to adopt the form of an axial helicoid flow configuration, and introducing a material to be treated (e.g., fuel) in the form of an axial phase, into a recessed, reduced pressure region of that flow so as to cause the axial phase to be broken up and subjected to treatment by an associated volume of gas.

SUMMARY OF THE INVENTION

It is, therefore, an object of the present invention to provide such a reaction chamber which is characterized by cool walls and high gas temperatures.

These objects are achieved by a high temperature reaction apparatus comprising a reaction chamber formed of a hollow body having an internal wall which is symmetrical about a longitudinal axis. A pipe is provided for feeding a gaseous reactant to said reaction chambers and includes an annular space surrounding the reaction chamber. A first conduit delivers the gaseous reactant. A plurality of second conduits communicate the annular space with the reaction chamber and are arranged to introduce the gaseous reactant tangentially into the latter to establish a helical flow of gaseous reactant therein. Cooling conduits are disposed between the annular space and the reaction chamber.

THE DRAWING

The objects and advangates of the invention will become apparent from the following detailed description of a preferred embodiment thereof, in connection with the accompanying drawing in which like numerals designate like elements, and in which:

FIG. 3 is a schematic view of the reactor according to FIGS. 1 and 2 arranged for use in series with a pair of contacting chambers.

DETAILED DESCRIPTION OF THE INVENTION

Figure 1:
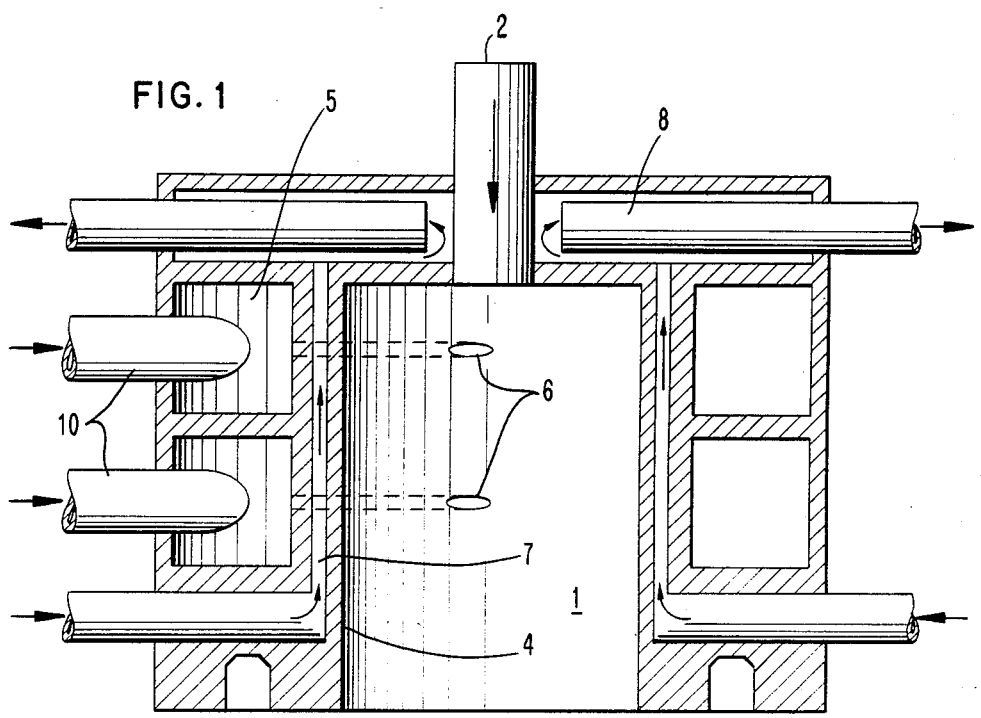
FIG. 1 is a longitudinal sectional view through a reactor according to the present invention.
Figure 2:
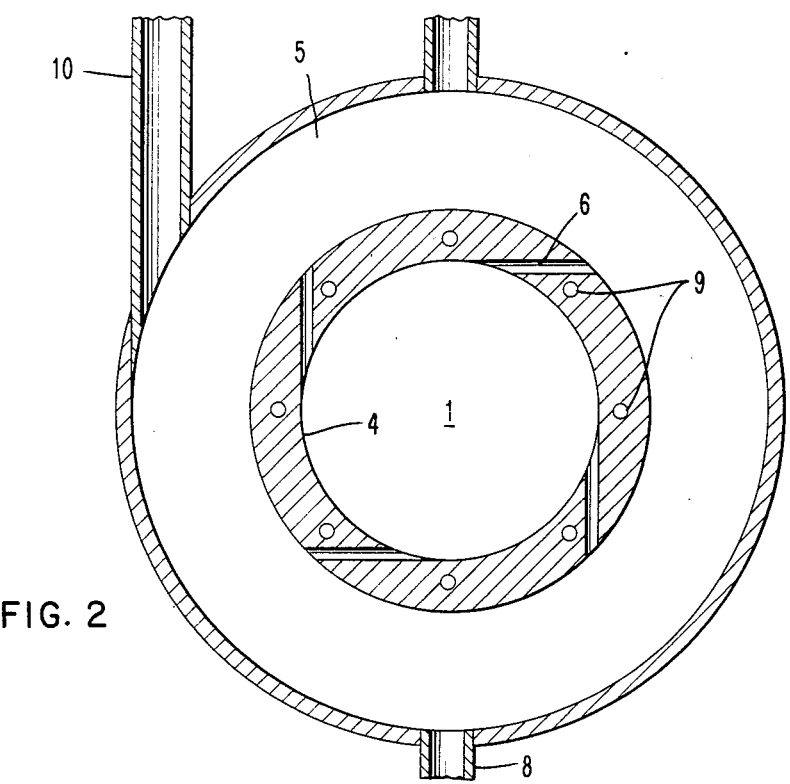
FIG. 2 is a cross-sectional view taken through the reactor of FIG. 1.

The apparatus according to the invention comprises a reaction chamber 1 formed by a hollow body having an internal wall 4 which is shaped to be symmetrical about a longitudinal axis such as a cylindrical shape. A passage arrangement for feeding at least one reactant in gaseous form comprises annular spaces 5 surrounding the reaction chamber. The spaces 5 are fed by pipes 10 and communicate with the reaction chamber 1 by means of conduits 6 which open tangentially thereinto, so as to introduce the gaseous phase into the reaction chamber in the form of a symmetrical helical flow (helicoid). A cooling means 7 is provided which comprises a series of passages 9 disposed between the annular space 5 and the reaction chamber 1. A cooling medium flows through the passages 9. The passages 9 communicate with manifolds 8 at a rear end of the reactor which thus provides for a cooling of that end.

The cooling means 7 may comprise a double casing or a distribution system for supplying the assembly of cooling ducts 9 which are provided in the actual mass of the apparatus and which preferably extend parallel to the longitudinal axis.

The apparatus according to the invention may also have a conduit 2 for feeding at least one reactant in liquid form (e.g., fule), along the longitudinal axis of the gaseous helicoid.

The system for feeding the reactant or reactants in gaseous forms is, in a simple construction, formed by distribution toruses in the form of the annular spaces 5.

The apparatus according to the invention, having cooled walls, may advantageously be employed, in accordance with modification of the apparatus described in the afore-mentioned U.S. Pat. Nos. 4,350,101 and 4,257,339 to form an installation which comprises a reaction chamber 1A, in particular, a combustion chamber, and a contacting chamber 2A, wherein the reaction chamber terminates in a downstream direction with a convergent portion 20 into which an injection device 22 extends along the axis of the reaction chamber. The device 22 injects a substance substantially at a restricted passage 24 defined by the convergent portion 20. The contacting chamber 2A extends from the reaction chamber 1A in a downstream direction along the same longitudinal axis.

Downstream of the contacting chamber 2A is an optional further contacting chamber 3A. A conduit 30 introduces a substance coaxially with the chamber 3A at a passage 32 of reduced diameter. The following table sets forth various possible used of the apparatus according to the present invention by providing examples of the substances which can be added to the system of FIG. 3.

TABLE

| CHAMBER 1A | CHAMBERS 1A and 2A | CHAMBERS 1A, 2A and 3A |
| --- | --- | --- |
| $R_1 = H_2$ | $R_1 = H_2$ | $R_1$ = gaseous HC |
| $R_2$ = air and/or $O_2$ | $R_2$ = air and/or $O_2$ | $R_2$ = air and/or $O_2$ |
| $R_3 = H_2O$ vapor | $P_1$ = liquid HC | in excess |

TABLE-continued

| CHAMBER 1A | CHAMBERS 1A and 2A | CHAMBERS 1A, 2A and 3A |
| --- | --- | --- |
| (optionally) Generation of hot gases and/or production of super heated steam<br>$R_1$ = gaseous or liquid HC<br>$R_2$ = air and/or oxygen<br>Generation of hot gases<br>$R_1$ = gaseous HC<br>$R_2$ = $O_2$ (deficiency)<br>$R_3$ = $CO_2$ and/or $H_2O$ (optionally)<br>Production of $C_2H_2$ and/or synthesis gas and cracked HC | and/or coal in suspension<br>$P_2$ = combustion additive (optionally)<br>$A_1$ = $O_2$ and/or air (excess)<br>Generation of hot gases by clean combustion<br>$R_1$ = $H_2$ (optionally in excess) or gaseous HC<br>$R_2$ = $O_2$<br>$R_3$ = $H_2O$ vapor (optionally)<br>$P_1$ = liquid HC<br>Steam cracking<br>$R_1$ = $H_2$ or gaseous HC<br>$R_2$ = $O_2$<br>$R_3$ = $H_2O$ vapor and/or $CO_2$ (optionally)<br>$P_1$ = C in suspension<br>$A_1$ = $H_2O$ vapor and/or $CO_2$ (optionally)<br>Gasification of coal<br>$R_1$ = $H_2$<br>$R_2$ = $Cl_2$<br>$P_1$ = $H_2O$ (optionally)<br>Production of HCl in gaseous form and/or in solution<br>$R_1$ = $H_2$<br>$R_2$ = $Cl2$ in excess<br>$P_1$ = liquid HC<br>Direct chlorination of HC to form chlorinated solvents | $P_1$ = liquid HC<br>$A_1$ = air and/or $O_2$ in excess<br>$Q_1$ = (a) mineral solutions or suspensions; drying or concentration thereof<br>(b) residual water depollution<br>$R_1$ = liquid or gaseous hydrocarbon (HC)<br>$R_2$ = air (in excess)<br>$P_1$ = halogenated byproducts (e.g., $C_2H_2Cl_{1.8}$)<br>$A_1$ = air (in excess)<br>$Q_1$ = water or HX solution<br>Destruction of halogenated byproducts |

It is advantageous from the point of view of economy for the gaseous phase which in each case forms a symmetrical helical flow to be introduced under a low pressure.

The difference between the pressure of the phase forming the symmetrical helical flow and the pressure obtaining directly downstream of the restricted passage is preferably less than $10^5$ Pa, when that pressure is close to atmospheric pressure.

By virtue of the apparatus according to the invention, the gases at the outlet from the combustion chamber may be raised to a temperature of between 1000° and 2500° C. and even higher.

Therefore, the field of use is enlarged accordingly and makes it possible to approach an area which is normally reserved for plasma processes.

Moreover, and without limitation, it is possible to incorporate the following features:

(a) cooling at the outlet of the contacting chamber, and (b) a plurality of contacting chambers in series, with or without complementary treatment.

It is also possible to provide means for injecting a liquid and/or gaseous phase, making it possible to introduce a binder or to produce a quenching action. It is also possible to provide for one or more recycling steps and the simultaneous introduction of a plurality of phases, in particular in the form of co-spraying of the phases.

The disclosures of the afore-mentioned U.S. Pat. Nos. 4,257,339; 4,350,101; and 4,124,353 are all incorporated herein by reference.

Compare also our copending applications, Ser. No. 612,543, Ser. No. 612,473 and Ser. No. 612,542, all filed concurrently herewith, all assigned to the assignee hereof and all expressly incorporated by reference hereby.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A high temperature reaction apparatus comprising:
   a reaction chamber formed of a hollow body having an internal wall which is symmetrical about a longitudinal axis,
   means for feeding a gaseous reactant to said reaction chamber, comprising:
      a plurality of annular spaces surrounding said reaction chamber, each having the form of a torus,
      at least one first conduit for delivering the gaseous reactant to each annular space,
      a plurality of second conduits communicating each annular space with said reaction chamber and arranged to introduce the gaseous reactant tangentially into said chamber to establish a symmetrical helical flow of gaseous reactant therein, and cooling means disposed between said annular spaces and said reaction chamber.

2. Apparatus according to claim 1, including cooling means disposed at a rear end of said body.

3. Apparatus according to claim 1 wherein said cooling means is contained in a double casing.

4. Apparatus according to claim 1, including a third conduit for feeding a liquid reactant to said reaction chamber.

5. Apparatus according to claim 4, wherein said third conduit is arranged for feeding said liquid reactant into said reaction chamber along the longitudinal axis of said symmetrical helical flow of gaseous reactant.

6. Apparatus according to claim 1, wherein said cooling means includes a plurality of passages for the flow of a cooling medium.

7. Apparatus according to claim 6, wherein said passages are contained within the mass of said internal wall.

8. An installation comprising a reactor and a contacting chamber communicating therewith, said reactor comprising:

a reaction chamber formed of a hollow body having an internal wall which is symmetrical about a longitudinal axis, means for feeding a gaseous reactant to said reaction chamber, comprising:

at least one annular space surrounding said reaction chamber, at least one first conduit for delivering the gaseous reactant to each annular space, a plurality of second conduits communicating each annular space with said reaction chamber and arranged to introduce the gaseous reactant tangentially into the latter to establish a symmetrical helical flow of gaseous reactant therein, cooling means disposed between said annular space and said reaction chamber, wherein said plurality of second conduits are so arranged to establish symmetrical helical flow of gaseous reactant within said reaction chamber and said cooling means are so disposed between said annular spaces and said reaction chamber that gases at the outlet passage from said reaction chamber can be raised to a temperature of at least about 1000° C., a downstream end of said reaction chamber terminating in a convergent portion forming a restricted outlet passage, an injection means arranged to introduce a substance coaxially into said convergent portion at said restricted passage, and a contacting chamber extending coaxially from said downstream end of said reaction chamber.

9. Installation according to claim 8 including an additional contacting chamber extending coaxially from a downstream end of said first-named contacting chamber.

10. An installation according to claim 8, wherein said contacting chamber also has a downstream end terminating in a convergent portion forming a second restricted outlet passage.

11. An installation according to claim 10, further comprising injection means arranged to introduce a substance coaxially into said convergent portion of said contacting chamber at said second restricted outlet passage.

12. A high temperature reaction apparatus comprising:

(a) a reaction chamber enclosed by a cylindrical wall symmetrical about a longitudinal axis, (b) means for feeding at least one gaseous reactant to said reaction chamber, comprising:

(i) at least two annular spaces surrounding said cylindrical wall, (ii) at least one conduit for delivering said gaseous reactant to each of said annular spaces, and (iii) a plurality of second conduits connecting each of said annular spaces with said reaction chamber, and arranged to introduce said gaseous reactant tangentially into said chamber to establish a symmetrical helical flow of gaseous reactant therein, and (c) cooling means disposed between said annular spaces and said reaction chamber, wherein said plurality of second conduits are so arranged to establish symmetrical helical flow of gaseous reactant within said reaction chamber and said cooling means are so disposed between said annular space and said reaction chamber so that the gases at the outlet from said reaction chamber can be raised to a temperature of at least about 1000° C.

13. Apparatus according to claim 12, wherein said cooling means are contained within the mass of said cylindrical wall.

14. Apparatus according to claim 12, wherein said cooling means are contained in a double casing concentric with said cylindrical wall.

15. Apparatus according to claim 12, comprising cooling means at the upstream wall of said reaction chamber.

16. Apparatus according to claim 12, further comprising a third conduit for feeding a liquid reactant to said reaction chamber along said longitudinal axis.

17. A high temperature reaction apparatus comprising:

a reaction chamber formed of a hollow body having an internal wall which is symmetrical about a longitudinal axis, means for feeding a gaseous reactant to said reaction chamber, comprising:

at least one annular space surrounding said reaction chamber, at least one first conduit for delivering the gaseous reactant to each annular space, a plurality of second conduits communicating each annular space with said reaction chamber and arranged to introduce the gaseous reactant tangentially into said chamber to establish a symmetrical helical flow of gaseous reactant therein, and cooling means disposed between said annular spaces and said reaction chamber, wherein said plurality of second conduits are so arranged to establish symmetrical helical flow of gaseous reactant within said reaction chamber and said cooling means are so disposed between said annular spaces and said reaction chamber so that gases at the outlet passage from said reaction chamber can be raised to a temperature of at least about 1000° C.

18. Apparatus according to claim 17, wherein said plurality of second conduits are so arranged and said cooling means are so disposed that gases at the outlet passage from said reaction chamber can be raised to a temperature in the range of from about 1000° C. to about 2500° C.

19. An installation according to claim 8, wherein said plurality of second conduits are so arranged and said cooling means are so disposed that gases at the outlet passage from said reaction chamber can be raised to a temperature in the range of from about 1000° C. to about 2500° C.

* * * * *